United States Patent
Liu et al.

(10) Patent No.: US 7,141,983 B2
(45) Date of Patent: Nov. 28, 2006

(54) COLD CATHODE DEVICE AND VACUUM GAUGE USING SAME

(75) Inventors: Peng Liu, Beijing (CN); Lei-Mei Sheng, Beijing (CN); Yang Wei, Beijing (CN); Liang Liu, Beijing (CN); Jing Qi, Beijing (CN); Shou-Shan Fan, Beijing (CN)

(73) Assignees: Hon Hai Precision Industry Co., Ltd. (TW); Tsinghua University, Beijing (CN)

( * ) Notice: Subject to any disclaimer, the term of this patent is extended or adjusted under 35 U.S.C. 154(b) by 0 days.

(21) Appl. No.: 11/092,087

(22) Filed: Mar. 29, 2005

(65) Prior Publication Data

US 2005/0237066 A1  Oct. 27, 2005

(30) Foreign Application Priority Data

Apr. 21, 2004  (CN) .................... 2004 1 0027020

(51) Int. Cl.
  *G01L 21/34*  (2006.01)
(52) U.S. Cl. .................................... 324/460
(58) Field of Classification Search .......... 324/460, 324/464; 313/295
  See application file for complete search history.

(56) References Cited

U.S. PATENT DOCUMENTS

| | | | |
|---|---|---|---|
| 3,051,868 A * | 8/1962 | Redhead | 315/108 |
| 3,378,712 A * | 4/1968 | Lafferty | 313/7 |
| 5,278,510 A * | 1/1994 | Baptist et al. | 324/460 |
| 5,422,573 A * | 6/1995 | Bills et al. | 324/460 |
| 6,025,723 A | 2/2000 | Bills | |
| 6,046,456 A | 4/2000 | Bills | |
| 6,198,105 B1 | 3/2001 | Bills | |
| 6,257,069 B1 * | 7/2001 | Brady et al. | 73/753 |
| 6,515,482 B1 * | 2/2003 | Kawasaki | 324/460 |
| 6,566,884 B1 | 5/2003 | Rutherford et al. | |
| 7,049,823 B1 * | 5/2006 | Correale | 324/460 |
| 2003/0057953 A1 * | 3/2003 | Rutherford et al. | 324/460 |

FOREIGN PATENT DOCUMENTS

TW  413828  12/2000

\* cited by examiner

*Primary Examiner*—Hezron Williams
*Assistant Examiner*—Ryan Christensen
(74) *Attorney, Agent, or Firm*—Morris Manning & Martin; Tim Tingkang Xia, Esq.

(57) ABSTRACT

A cold cathode device (20) includes a grid (24), a cold cathode (21) positioned under the grid, and a shield electrode (26) positioned above and parallel to the grid. A vacuum gauge includes a shell (32), a collector (39), an anode (38), and the cold cathode device of the present invention. The cold cathode device and the collector are positioned symmetrically relative to the anode. The collector, the grid and the cold cathode device are received in the shell. The shield electrode can shield an electric field of the grid for preventing from disturbing a symmetrical saddle field in the vacuum gauge. Electrons produced by the cold cathode device can obtain a long electron track because the electron vibration in the saddle field is symmetrical. Thus, the vacuum gauge has an improved sensitivity, and can be widely used to measure pressure in ultra-high and extremely high vacuum conditions.

14 Claims, 3 Drawing Sheets

COLD CATHODE DEVICE AND VACUUM GAUGE USING SAME

BACKGROUND OF THE INVENTION

1. Field of the Invention

The present invention relates to ultra-high and extremely high vacuum measuring devices, and especially to a cold cathode device and a vacuum gauge having the cold cathode device used for measuring pressure in ultra-high or extremely high vacuum conditions.

2. Prior Art

Nowadays, high vacuum conditions are employed in many fields of endeavor, such as in simulation technology in aerospace, superconductor technology, nuclear fusion technology, ultra-low temperature technology, and huge particle accelerator technology. Vacuum gauges for measuring pressure in ultra-high and extremely high vacuum conditions are needed.

A BA ionization gauge invented by Bayard and Alpert in 1950 is widely used for measuring pressures in ultra-high vacuum conditions. Referring to FIG. 4, the BA ionization gauge includes a glass shell 4, a collector 2, a grid 5, at least one thermionic filament 1, and several filament leads 3 for connecting the filament 1. However, the gauge has a large volume and many electrodes. Many gas molecules and ions are adsorbed onto surfaces of the electrodes. When the vacuum pressure rises, the gas molecules and ions adsorbed on the surfaces of the electrodes can be released into the gauge. Therefore the BA ionization gauge can only be used in a dynamic vacuum system, and is not suitable for measuring pressure in ultra-high and extremely high vacuum conditions. A vacuum gauge marketed under the brand name AxTRAN by ULVAC technologies, Inc. is used for measuring pressure in ultra-high and extremely high vacuum conditions. The AxTRAN vacuum gauge can measure pressures of as little as $10^{-11}$ Pa. However, the AxTR.AN vacuum gauge has a complex structure, and it is difficult to eliminate gases. Therefore the AxTRAN vacuum gauge has limited appeal in the marketplace.

In general, a gauge for measuring pressure in ultra-high and extremely high vacuum conditions should be small, and should have little release of gas. Further, a gauge used in aerospace should also be energy efficient. In particular, the gauge should be light in weight, and a corresponding power supply should also be light in weight.

In the 1980s, Chen, Pi-Jin and Li, You-Ze, of the Department of Electronic Engineering of Tsinghua University, China, developed a saddle field gauge to measure pressure in extremely high vacuum conditions, based on a micro-ionization gauge. Refer to Science of Vacuum Technology, 1987, National Defence Publishing Company. The saddle field gauge can obtain a very long electron track by using a static saddle field to restrict electron vibration. This improves the sensitivity of the saddle field gauge.

In the year 2000, China Pat. No. 94100653.0 to Chen, Pi-Jin and Qi, Sing showed a micro-ionization gauge having a wide range, the gauge employing a field emission source as an electron emitter. The micro-ionization gauge includes a glass shell, an anode, an ion collector, a field emission source, and a metal film electrode. The field emission source employs a Spindt type field emission source instead of a thermionic cathode, for avoiding adsorbing and releasing of gases caused by chemical reactions on surfaces of a thermionic cathode. However, the Spindt type field emission source has a grid to control the projecting of the electrons. Therefore the sensitivity of the micro-ionization gauge is influenced by an electric field produced by the grid.

China Pat. No. 99109355.0 discloses an extremely high vacuum ionization gauge which has a very low rate of adsorbing and releasing of gases. The ionization gauge uses a field emission cold cathode, instead of various kinds of thermionic cathodes, to improve the sensitivity of ionization gauge. However, the cold cathode has a grid. The potential of the grid disturbs the entire electric field distribution of the ionization gauge, and distorts the symmetry of a saddle field in the ionization gauge. Therefore the vibration of electrons in the ionization gauge is asymmetrical, which reduces the sensitivity of the ionization gauge.

It is desired to provide a cold cathode device and a vacuum gauge having the cold cathode device which overcome the above-described shortcomings.

SUMMARY OF THE INVENTION

An object of the present invention is to provide a cold cathode device which can avoid disturbance of the potential of a grid therewithin.

Another object of the present invention is to provide a vacuum gauge for measuring pressure in ultra-high and extremely high vacuum conditions, the vacuum gauge having improved sensitivity.

In order to achieve the first above-mentioned object, a cold cathode device in accordance with the present invention comprises a grid, a cold cathode positioned under the grid, and a shield electrode positioned above and parallel to the grid. The cold cathode is a field emission structure. The field emission structure may comprises carbon nanotubes, a tungsten needle, a molybdenum needle, a silicon needle, or any combination thereof.

In order to achieve the second above-mentioned object, a vacuum gauge for measuring pressure in ultra-high and extremely high vacuum conditions in accordance with the present invention comprises a shell, a collector, an anode, and the cold cathode device according to the present invention. The cold cathode device and the collector are positioned symmetrically relative to the anode. The collector, the anode and the cold cathode device are at least partly received in the shell.

Compared with a conventional vacuum gauge, the vacuum gauge of the present invention has the shield electrode for shielding an electric field of the grid for preventing from disturbing a symmetrical saddle field in the vacuum gauge. Electrons produced by the cold cathode device can obtain a long electron track because the electron vibration in the saddle field is symmetrical. Thus, the vacuum gauge has an improved sensitivity, and can be widely used to measure pressure in ultra-high and extremely high vacuum conditions.

Other objects, advantages and novel features of the present invention will become more apparent from the following detailed description and claims, and from the accompanying drawings, in which:

DETAILED DESCRIPTION OF THE INVENTION

Figure 1:
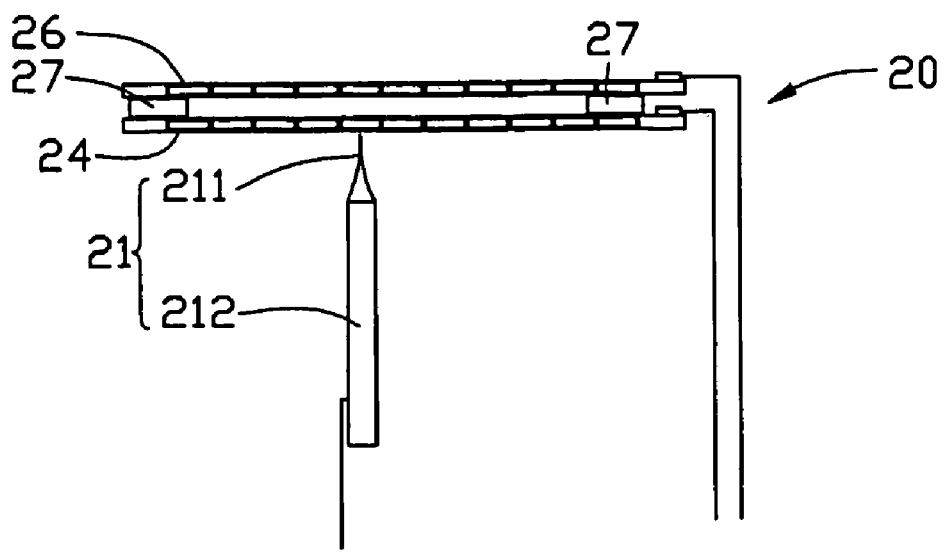
FIG. 1 is a schematic, side cross-sectional view of a cold cathode device in accordance with a preferred embodiment of the present invention.

Referring to FIG. 1, a cold cathode device 20 in accordance with the present invention comprises a grid 24, a shield electrode 26 positioned above and parallel to the grid 24, and a cold cathode 21 positioned under the grid 24. The cold cathode 21, the grid 24 and the shield electrode 26 are respectively connected to an exterior circuit by a lead. The grid 24 and the shield electrode 26 are separated by one or more insulating sheets 27 positioned therebetween.

The cold cathode 21 is a field emission structure. The field emission structure may comprise carbon nanotubes, a tungsten needle, a molybdenum needle, a silicon needle, or any combination thereof. The grid 24 has an aperture structure. Thus metallic rings, metallic-enclosed apertures or a metallic net can be used as the grid 24. The shield electrode 26 can have a structure the same as that of the grid 24, or can have a structure different from that of the grid 24. In either case, the shield electrode 26 has the function of shielding an electric field of the grid 24 and ensuring that electrons shoot out from the grid 24.

According to one embodiment of the cold cathode device 20 of the present invention, the cold cathode 21 includes a tungsten needle 212, and a plurality of multi-walled carbon nanotubes 211 positioned at an end of the tungsten needle 212 and pointing toward the grid 24. The grid 24 and the shield electrode 26 employ a metallic grid net with numerous apertures. The apertures of the grid 24 and the apertures of the shield electrode 26 substantially coincide with each other. The multi-walled carbon nanotubes 211 coincide with a respective pair of apertures of the grid 24 and the shield electrode 26. When using the cold cathode device 20, electrons are launched from the multi-walled carbon nanotubes 211, are drawn out by the grid 24, and finally pass through the shield electrode 26 and shoot out therefrom. The shield electrode 26 substantially shields the electric field of the grid 24. Therefore, the electric field of the grid 24 cannot interfere with an electric field outside of the shield electrode 26.

The apertures of the grid 24 can be accurately aligned with the apertures of the shield electrode 26 by using a microscope. The grid 24 and the shield electrode 26 also can be integrally formed to make the apertures thereof coincide with each other. If the cold cathode 21 is one emitter, the emitter must be accurately aligned with a respective pair of apertures of the grid 24 and the shield electrode 26. If the cold cathode 21 employs many emitters such as large-area array emitters, it is only required that the apertures of the grid 24 and the apertures of the shield electrode 26 are aligned with each other. Alternatively, the cold cathode 21, the grid 24 and the shield electrode 26 can be integrally formed together by light etching technology or other suitable technologies.

Figure 2:
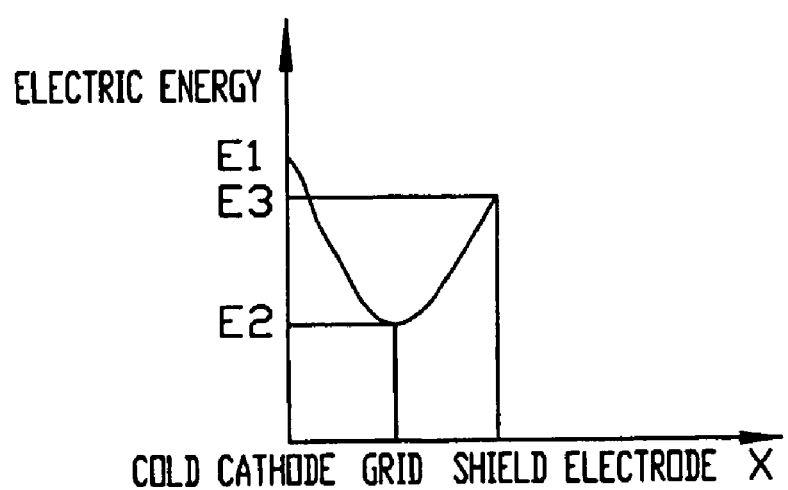
FIG. 2 is an electric energy distribution diagram of a cold cathode, a grid and a shield electrode of the cold cathode device of FIG. 1.

Referring to FIG. 2, this is an electric energy distribution diagram of the cold cathode 21 (E1), the grid 24 (E2) and the shield electrode 26 (E3) of the cold cathode device 20. The shield electrode 26 can selectively adjust the electric potential of the grid 24. Therefore, the electric field of the grid 24 cannot interfere with an electric field outside of the shield electrode 26. Generally, an electric potential of the shield electrode 26 will be about several tens of volts higher in magnitude than that of the cold cathode 21, for fully ensuring the emission of the electrons. It is estimated that still over 20 percent of the electrons can shoot out when the shield electrode 26 and the grid 24 are synchronously controlled to a same electric potential. Therefore the cold cathode device 20 of the present invention is well equipped to function as an electron source.

Figure 3:
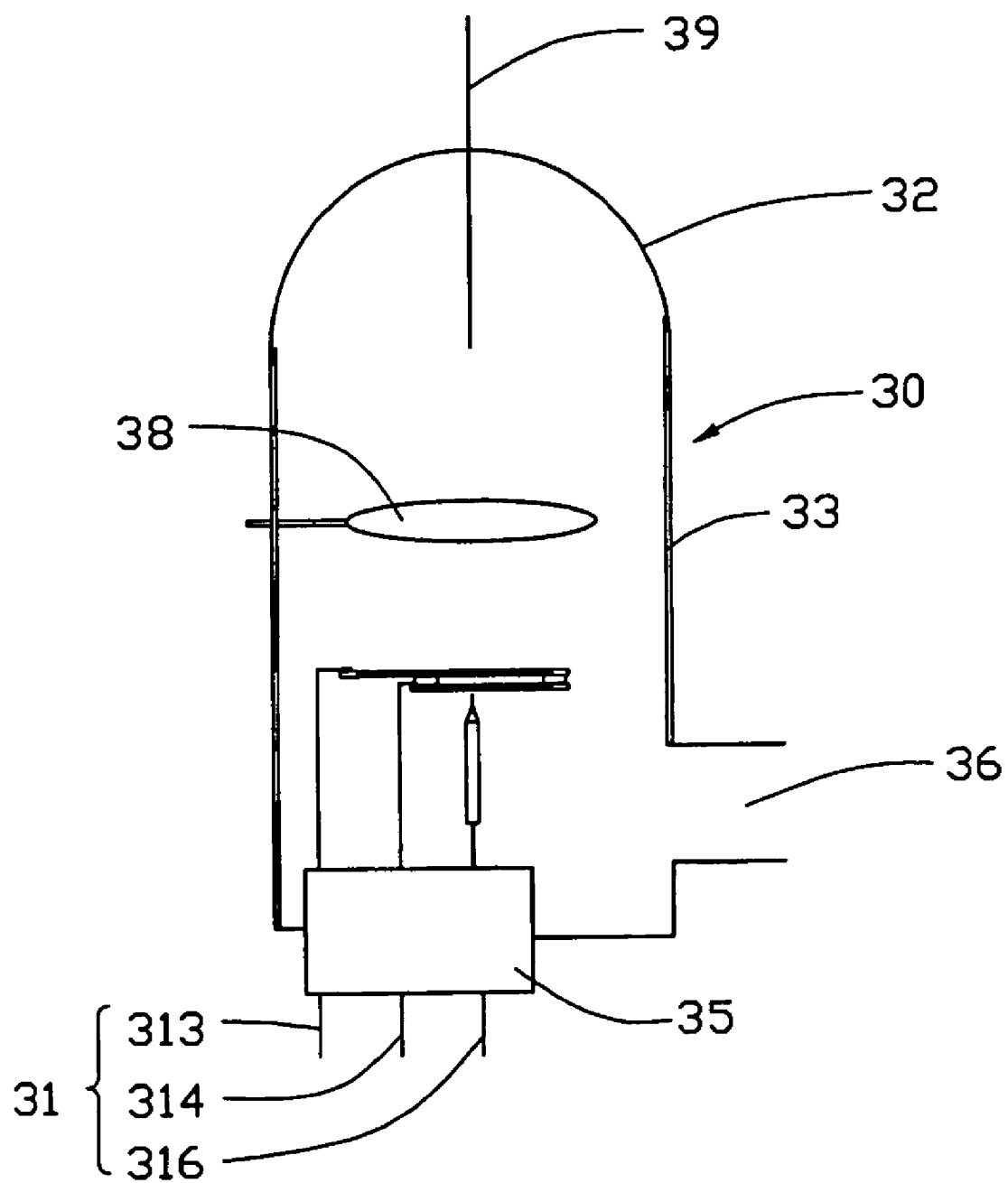
FIG. 3 is a schematic, side cross-sectional view of a vacuum gauge using the cold cathode device of FIG. 1.
Figure 4:
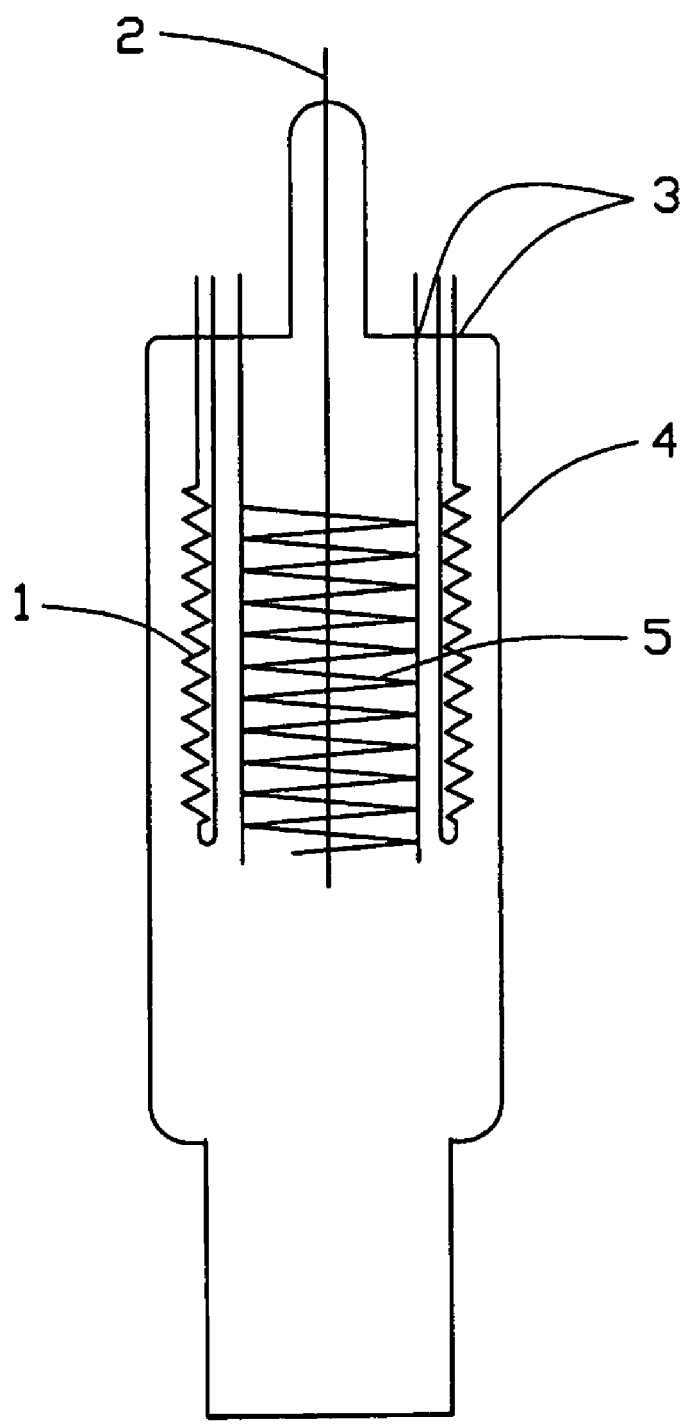
FIG. 4 is a schematic, side cross-sectional view of a conventional BA ionization gauge.

Referring to FIG. 3, a vacuum gauge 30 which uses a cold cathode device according to the present invention comprises a shell 32, a core column 35 connected to a bottom surface of the shell 32, a gold film 33 formed on an inner surface of the shell 32, a collector 39 positioned in a top of the shell 32, an anode 38 positioned in a middle of the shell 32, and a cold cathode device 31 fixed to the core column 35. The cold cathode device 31 comprises a grid 314, a shield electrode 313 positioned above and parallel to the grid 314, and a cold cathode 316 positioned under the grid 314. The cold cathode device 31 and the collector 39 are supported symmetrically relative to the anode 38 by two support poles (not shown) in the vacuum gauge 30. That is, a distance from the cold device 31 to the anode 38 is the same as a distance from the collector 39 to the anode 38. Hence, a gas reaction space is symmetrically located at two sides of the anode 38 between the collector 39 and the cold device 31. An opening 36 is defined in a side wall of the shell 32, for connection of a device (not shown) to be measured. The anode 38 employs ringed or apertured electrodes. In general, the electric potential of the gold film 33 is zero, for providing an offset voltage in the vacuum gauge 30.

The cold cathode 316 of the cold cathode device 31 of the present invention comprises a field emission structure. The field emission structure may comprise carbon nanotubes, a tungsten needle, a molybdenum needle, a silicon needle, or any combination thereof. The grid 314 has an aperture structure. Thus metallic rings, inetallic-enclosed apertures or a metallic net can be used as the grid 314. The shield electrode 313 can have a structure the same as that of the grid 314, or can have a structure different from that of the grid 314. In either case, the shield electrode 313 has the function of shielding an electric field of the grid 314 and ensuring that electrons shoot out from the grid 314.

According to one embodiment of the vacuum gauge 30 of the present invention, the cold cathode 316 of the cold cathode device 31 includes a tungsten needle, and a plurality of multi-walled carbon nanotubes positioned at an end of the tungsten needle. The grid 314 and the shield electrode 313 employ a metallic grid net with numerous apertures. The apertures of the shield electrode 313 and the apertures of the grid 314 substantially coincide with each other. The multi-walled carbon nanotubes coincide with a respective pair of apertures of the shield electrode 313 and the grid 314. When using the cold cathode device 31, electrons are launched from the multi-walled carbon nanotubes, are drawn out by the grid 314, and finally pass through the shield electrode 313 and shoot out therefrom. The shield electrode 313 substantially shields an electric field of the grid 314. Therefore, the electric field of the grid 314 cannot interfere with an electric field outside of the shield electrode 313.

According to the illustrated embodiment of the vacuum gauge 30 of the present invention, the anode 38 is a metallic ring which is fixed into the middle of the vacuum gauge 30. The anode 38 is connected to an exterior power supply (not shown). When the anode 38 is provided a voltage, the metallic ring of the anode 38 produces a saddle field within the gas reaction space in the vacuum gauge 30. A saddle point of the saddle field is produced at a centre of the metallic ring of the anode 38. Saddle field lines adjacent to the saddle point bend intensively, and saddle field lines far from the saddle point are essentially radial straight lines whose centre is the saddle point.

In operation, suppose an electron is launched by the cold cathode device 31. The electron is drawn and accelerated toward the anode 38 by the electric potential of the anode 38. The electron passes through the anode 38 because of the inertia of the electron. Before the electron arrives at the collector 39, the electron is drawn back to the anode 38 by the electric potential of the anode 38. Therefore, the electron vibrates in the gas reaction space between the cold cathode device 31 and the collector 39. Because the cold cathode device 31 and the collector 39 are positioned symmetrically relative to the anode 38, the electron can vibrate between them many times. Thus, the electron's track is very long. In a typical working condition, the electron's track can be several kilometers long, and the sensitivity of the vacuum gauge 30 is improved. Finally, the electron arrives at the anode 38 and an electric current loop is formed. When the electron is still moving, the electron collides with gas molecules and ionizes some of the gas molecules. Typically, many positive ions are produced, and are collected by the collector 39. The collector 39 has a slight positive potential, and thus an ion current is formed. The ion current is proportional to a pressure in the vacuum gauge 30 within a certain pressure range. Therefore, the pressure in the vacuum gauge 30 can be measured according to this relation. Thus, the vacuum gauge 30 has improved sensitivity, and can be widely used to measure pressure in ultra-high and extremely high vacuum conditions.

The cold cathode device with a shield electrode of the present invention can used instead of many kinds of hot filament cathode devices, without affecting the desired electric field distribution. Further, the cold cathode device can be widely used in many fields in which use of a hot filament cathode device is not appropriate.

It is to be understood that the cold cathode device with a shield electrode electrode of the present invention is not limited to the embodiments described herein. It is also to be understood that the grid and the shield electrode of the cold cathode device can be equipotential, if the cold cathode device is used in an apparatus which does not need electric field shielding.

While the present invention has been described with reference to particular embodiments, the description is illustrative of the present invention and is not to be construed as limiting the invention. Various modifications to the invention can be made to the described embodiments by those skilled in the art without departing from the true spirit and scope of the invention as defined by the appended claims.

We claim:

1. A vacuum gauge comprising:
a shell;
a collector;
a ring-shaped anode; and
a cold cathode device comprising a grid, a cold cathode having a field emission structure positioned under the grid, and a shield electrode positioned above and parallel to the grid, the field emission structure having a needle-shaped supporting member and a plurality of carbon nanotubes positioned at an end of the needle-shaped supporting member;
wherein the cold cathode device and the collector are positioned symmetrically relative to the ring-shaped anode, and the collector, the ring-shaped anode and the cold cathode device are at least partly received in the shell.

2. The vacuum gauge as claimed in claim 1, wherein the needle-shaped supporting member is selected from the group consisting of a tungsten needle, a molybdenum needle, and a silicon needle.

3. The vacuum gauge as claimed in claim 1, wherein the grid and the shield electrode have aperture structures.

4. The vacuum gauge as claimed in claim 3, wherein the aperture structures include metallic rings, metallic-enclosed apertures, or a metallic net.

5. The vacuum gauge as claimed in claim 3, wherein the apertures of the grid and the apertures of the shield electrode are substantially aligned with each other.

6. The vacuum gauge as claimed in claim 1, further comprising a metallic film formed on an inner surface of the shell.

7. The vacuum gauge as claimed in claim 1, further comprising a core column connected to a bottom surface of the shell, for fixing the cold cathode device thereat.

8. The vacuum gauge as claimed in claim 1, wherein a side wall of the shell defines an opening, for connection of an apparatus thereat for subsequent measurement of a pressure of the apparatus.

9. A vacuum gauge comprising:
an electrifiable aperture anode;
a cold cathode device spaced from said aperture anode, and used to provide electrons movable toward said aperture anode so that said electrons are movably active in a gas reaction space defined outside and beside said aperture anode; and
a collector spaced from said aperture anode and located at a side of said aperture anode opposite to said cold cathode device, said collector partially interfering within said gas reaction space so as to collect gas particles reacted with said movably active electrons from said gas reaction space for vacuum gauging;
wherein said cold cathode device comprises a field emission structure having a needle-shaped supporting member and a plurality of carbon nanotubes positioned at an end of the needle-shaped supporting member.

10. The vacuum gauge as claimed in claim 9, wherein said movably active electrons are capable of moving through said aperture anode and vibrating within said gas reaction space.

11. The vacuum gauge as claimed in claim 9, wherein a saddle field is generated by means of exclusively electrifying said aperture anode, and said saddle field substantially covers said gas reaction space.

12. The vacuum gauge as claimed in claim 9, wherein a shield electrode is formed in said cold cathode device and is capable of electrically shielding said gas reaction space and said aperture anode from said cold cathode device.

13. The vacuum gauge as claimed in claim 6, wherein the electric potential of the metallic film is zero.

14. The vacuum gauge as claimed in claim 9, wherein said electrons are vibratile in said gas reaction space between said cold cathode device and said collector under the influence of an electric field.

* * * * *